UNITED STATES PATENT OFFICE.

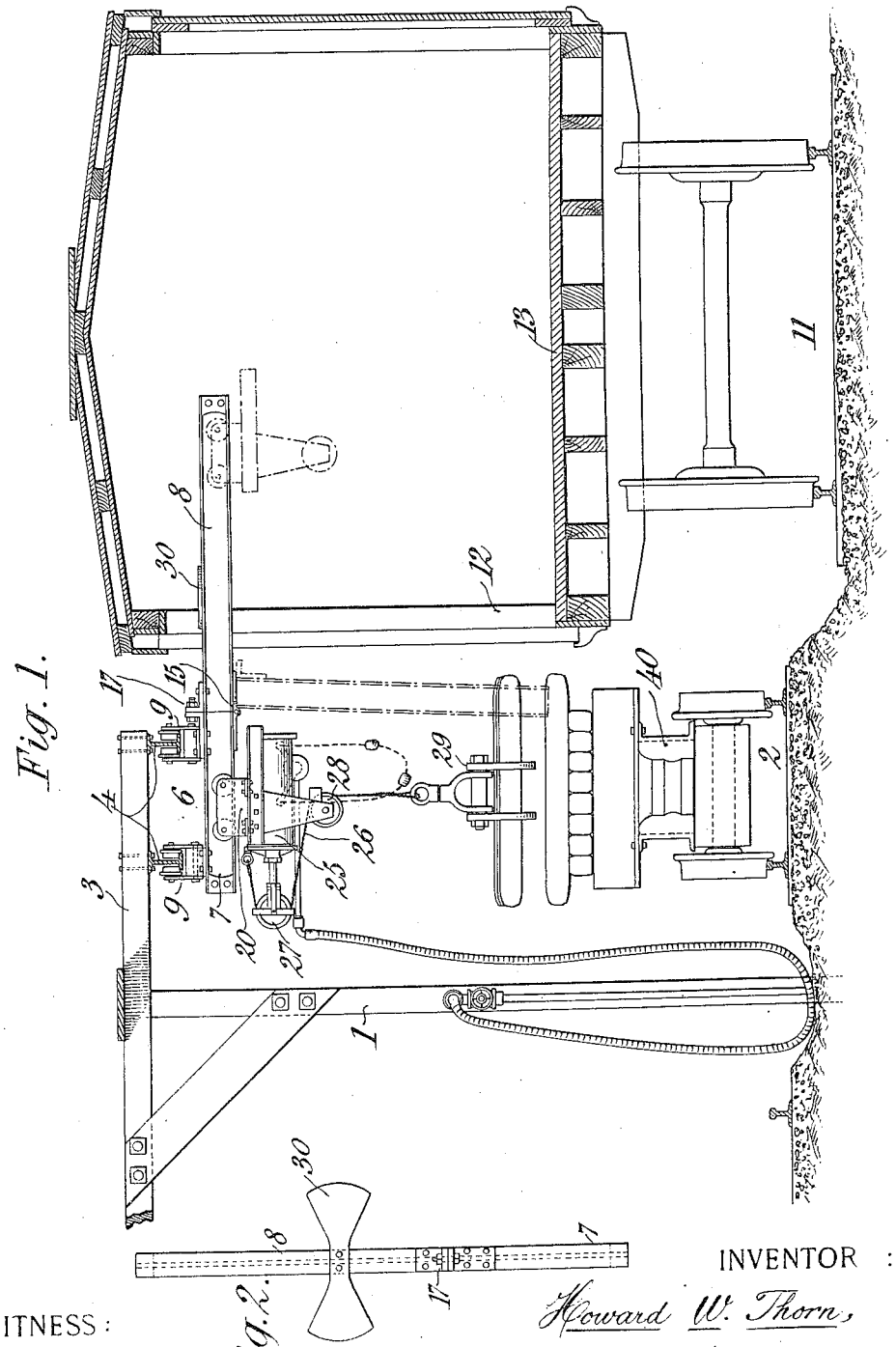

HOWARD W. THORN, OF CHROME, NEW JERSEY, ASSIGNOR TO UNITED STATES METALS REFINING CO., OF CHROME, NEW JERSEY, A CORPORATION OF NEW JERSEY.

LOADING AND UNLOADING DEVICE.

1,395,749.      Specification of Letters Patent.     Patented Nov. 1, 1921.

Application filed September 24, 1919. Serial No. 325,863.

*To all whom it may concern:*

Be it known that I, HOWARD W. THORN, a citizen of the United States of America, residing in Chrome, county of Middlesex, State of New Jersey, have invented certain new and useful Improvements in Loading and Unloading Devices, of which the following is a specification.

This invention relates to improvements in loading and unloading devices and installations, especially applicable for use in railroad yards and sidings, and aims to provide improvements therein.

The invention provides a device and structure whereby articles may be picked up from a position in front of the door of a freight car, or from a truck on a loading and unloading track alongside of the railroad track and in front of the door of a railroad car, and delivered inside of the freight car, or vice versa; that is, picked up from the interior of the freight car, and delivered upon a truck in front of the door of a freight car, or upon the ground, or other place alongside of the freight car.

The invention provides a device which may be readily moved from one car to another of a train of cars, or which may be moved to a car to be loaded or unloaded, without having to move the car.

The invention further provides a device having a rail upon which a carriage carrying hoist-means slides back and forth, which has a movable part which may be extended into the interior of a freight car, or withdrawn in such manner as not to project over the railroad, or beyond the sides of a car thereon.

The invention further provides means whereby the rail in which the hoist carriage moves is prevented from moving laterally when projecting through the door of a freight car, in such manner that the load carried by the hoist could strike against or come in contact with the sides of the door of the freight car.

The invention further provides certain combinations and arrangements in parts, hereinafter more fully set forth and described, whereby the functions of loading and unloading a freight car are carried out with comparative ease and celerity.

An embodiment of the invention is illustrated in the accompanying drawings.

In said drawings, Figure 1 is a sectional view across a railroad siding, and showing the aforesaid embodiment of the invention alongside a freight car, and in position to load material from a truck on a loading track alongside of the railroad track, into a freight car.

Fig. 2 is a plan view of the cross rail shown in Fig. 1, upon which the hoist-carriage runs or slides, and illustrating the means for spacing the said cross rail from the sides of the door.

In said drawings, numeral 1 designates a suitable framework alongside a loading and unloading track way or place 2, and having an overhead portion 3. Upon the overhead portion 3 of the framework there is suspended from the lower side thereof a rail or rails, preferably a pair of rails, 4. These rails 4 extend over and parallel to the loading and unloading track or way 2. The tracks 4 are most conveniently I beams.

Suspended from the overhead track or tracks 4, there is a cross rail 6, comprising a portion 7 and a portion 8. The portion 7 is attached to the rail or rails 4 through slidable connections 9, which conveniently comprise arms carrying rollers which roll upon the upper face of the lower flange of the I beams 4. The portion 8 is movable into and out of alinement with the portion 7 of the cross-rail. When extended or in its alined position, the portion 8 extends over the railroad track 11, and through a doorway 12 of a car 13 standing upon said railroad track, and when said portion 8 of the cross rail is withdrawn, it clears the railroad track and sufficient of the space beside the track to enable a freight car to pass without the said portion striking against its sides. To this end, the parts 7 and 8 of the cross rail are preferably hinged upon a horizontal pivot, as indicated at 15, and means, as indicated at 17, are preferably provided for holding the part 8 of the rail in extended position, where such part 8 is horizontally pivoted, as indicated. The fastening means 17 may comprise a bolt passing through lugs on the parts 7 and 8 respectively of the cross-rail.

The cross-rail 6 is most conveniently an I beam.

Upon the cross-rail 6 there is slidably mounted a carriage 20 which is slidable back and forth thereon, and which is conveniently provided with rollers which roll upon the upper faces of the lower flange of the I beams.

Upon the carriage 20 there is attached or mounted any suitable hoist means 25. As here shown, the hoist is a pneumatic hoist, comprising a cable 26, pulleys 27 and 28, one of which is moved in and out by the piston, and a hook 29.

In order to space the cross-beam 6 from the sides of the doorway of a car, when the portion 8 thereof is extended through a doorway, the head portion 8 of the cross-rail is preferably provided with lateral extensions or wings 30, and these lateral extensions preferably have broad extremities, being conveniently fan-shaped as shown, in order that the said projections 30 may contact with the sides of doors of cars of different widths.

The pieces or articles to be loaded are conveniently brought alongside the freight car to be loaded by a truck 40, the truck rolling upon the loading and unloading rails or way 2.

Operation: Articles to be loaded are brought to a position alongside a freight car, and are conveniently brought to said position upon a truck 40 running upon the rails or way 2. The cross rail carrying the hoist is then slid upon the overhead rails 4 to a position over the material to be loaded, and in front of the door of the freight car to be loaded. The hinged portion 8 of the cross-rail 6 is then brought to extended position, and fastened in said position by the means 17. The part 8 of the cross-rail then extends through the doorway into the interior of the freight car. The pneumatic hoist is operated to lower the cable with the hooks 29 thereon, and the articles are placed upon said hooks. The pneumatic hoist is then operated to lift the articles, and the carriage 20 carrying the hoist is slid along the cross-rail to a position inside of the freight car, as indicated by the dotted outline of the carriage. Here the hoist is operated to deposit the load upon the floor of the freight car, or upon a hand truck within the freight car. The carriage 20 carrying the hoist is thereupon slid back upon the cross-rail 6 to a position above the material to be loaded, taking up a new load and depositing it within the freight car in the manner just described. The projections or wings 30 prevent the cross-rail moving on the overhead rails 4 to such an extent that articles carried upon the hoist will strike against the sides of the doorway while the carriage is being slid along the cross-rail 6 into or out of the car.

To shift the hoist to a position in front of the door of another freight car, it is simply necessary to unloosen the fastening means 17, lower the portion 8 of the cross-rail, so that it clears the side of the freight car, and to slide the cross-rail on the overhead rails 4 until the parts reach said position in front of the door of another freight car. The portion 8 of the cross-rail is then raised so as to extend within the doorway, and loading is effected in the manner heretofore described.

Unloading of a freight car or cars is effected in a manner very analogous to loading, the loaded hoist being shifted from a position within the freight car to a position over a truck or other part or place alongside the freight car.

The inventive ideas herein set forth may receive other embodiments than those herein specifically illustrated and described.

What is claimed is:—

1. A loading and unloading device, comprising a hinged rail, and supporting means for said rail and on which said rail is movable, a carriage movable on said rail, and hoist means on said carriage, one part of said rail being attached to the supporting means, and the other part hingedly connected with said first part and provided with lateral extensions adapted to space said rail from the sides of a doorway into which the rail is adapted to be extended.

2. A loading and unloading device, comprising a hinged rail, overhead track suspending and supporting means for said rail and on which said rail is movable, a carriage movable on said rail, and hoist means on said carriage, one part of said rail being attached to said overhead suspension means, and the other part having movement to and from alinement with the first mentioned part of the rail, whereby said movable part may be extended within a doorway and be swung so as to clear said doorway.

3. A loading and unloading device, comprising an overhead framework having a track thereon, a cross rail horizontally suspended from said framework and movable relatively thereto along said track, a carriage movable on said cross rail, and hoist means on said carriage, said cross rail being formed of two hingedly connected sections, one of which is attached to the framework and the other normally forming substantially a right angle with the first and adapted to be brought into operative alinement therewith.

4. A loading and unloading device, comprising a rail, overhead track suspending and supporting means for said rail, and on which said rail is movable, a carriage movable on said rail, and hoist means on said carriage, said rail being hinged, one part being attached to said overhead suspension means and the other part having movement to and from alinement with the other part of the rail, whereby said movable hinged part may be extended within a doorway and be swung so as to clear said doorway, said movable hinged part of the rail having lateral extensions thereon adapted to space said rail from the sides of the doorway when extended within said doorway.

5. A loading and unloading device, comprising a suspended rail having a hinged movable part, a carriage movable on said rail, and hoist-means on said carriage, said hinged part of said rail having thereon lateral extensions for spacing the same from the sides of a doorway through which said rail may project.

6. A loading and unloading device, comprising a pair of suspended rails, a cross-rail suspended from and slidable on said pair of rails, a carriage on said cross-rail slidable thereon, and hoist-means on said carriage, said cross-rail having a hinged portion projecting beyond said pair of suspended rails normally out of alinement with said main cross-rail portion, but adapted to be brought into operative alinement therewith, and held in such alinement by rigid securing means.

7. A loading and unloading device, comprising a pair of suspended rails, a cross-rail suspended from and slidable on said pair of rails, a carriage on said cross-rail slidable thereon, and hoist-means on said carriage, said cross-rail having a horizontally hinged portion projecting beyond said pair of suspended rails normally out of alinement with said main cross-rail portion, but adapted to be brought into operative alinement therewith, and held in such alinement by rigid securing means.

8. A loading and unloading device comprising an overhead framework alongside a railroad track, a pair of rails suspended therefrom, and a cross-rail suspended from and slidable on said pair of rails, a carriage on said cross-rail slidable thereon, and hoist-means on said carriage said cross-rail having a hinged portion, adapted in one position to clear a car on said track, and in its extended position to extend through the doorway into a car, whereby said carriage carrying said hoist may slide on said cross-rail and deliver a load from a position alongside said car to a position within said car, or vice versa.

9. A loading and unloading installation comprising a loading and unloading track alongside a railroad track, an overhead framework over said loading and unloading track, a pair of rails suspended therefrom, and a cross rail suspended from and slidable on said pair of rails, a carriage on said cross-rail slidable thereon, and hoist means on said carriage said cross-rail having a hinged portion, adapted in one position to clear a car on said track, and in its extended position to extend through the doorway into a car, whereby said carriage carrying said hoist may slide on said cross-rail and deliver a load from a truck on said loading and unloading track to the interior of a car on said railroad track, or vice versa.

In witness whereof, I have hereunto signed my name.

HOWARD W. THORN.